United States Patent [19]

Scheurenbrand et al.

[11] Patent Number: 4,886,031
[45] Date of Patent: Dec. 12, 1989

[54] DASHPOT WITH FILTER FOR FUEL TANKS

[75] Inventors: Dieter Scheurenbrand, Wolfschlugen; Helmut Wawra, Korb, both of Fed. Rep. of Germany

[73] Assignee: Daimler-Benz Aktiengesellschaft, Stuttgart, Fed. Rep. of Germany

[21] Appl. No.: 206,112

[22] Filed: Jun. 13, 1988

[30] Foreign Application Priority Data

Jun. 13, 1987 [DE] Fed. Rep. of Germany ....... 3719809

[51] Int. Cl.$^4$ .................. F02M 39/00; F11B 1/00
[52] U.S. Cl. .................. 123/516; 123/510; 123/514; 417/151; 137/574
[58] Field of Search ............... 123/510, 511, 514, 509, 123/516; 417/80, 196, 151; 137/574, 570, 590, 592

[56] References Cited

U.S. PATENT DOCUMENTS

| | | | |
|---|---|---|---|
| 3,729,273 | 4/1973 | Shimrony | 417/151 |
| 4,397,333 | 8/1983 | Liba | 123/516 |
| 4,481,931 | 11/1984 | Bruner | 123/514 |
| 4,503,885 | 3/1985 | Hall | 123/516 |

FOREIGN PATENT DOCUMENTS

| | | | |
|---|---|---|---|
| 2401728 | 12/1983 | Fed. Rep. of Germany | 123/514 |
| 3612194 | 10/1986 | Fed. Rep. of Germany | 123/514 |
| 0119960 | 7/1983 | Japan | 123/514 |

Primary Examiner—Carl Stuart Miller

[57] ABSTRACT

In a dashpot for fuel tanks the cover of the intake chamber of the dashpot is dome-shaped and the suction filter is arranged at an interval below the cover. This arrangement prevents gas bubbles also being drawn off via the suction filter together with fuel.

6 Claims, 3 Drawing Sheets

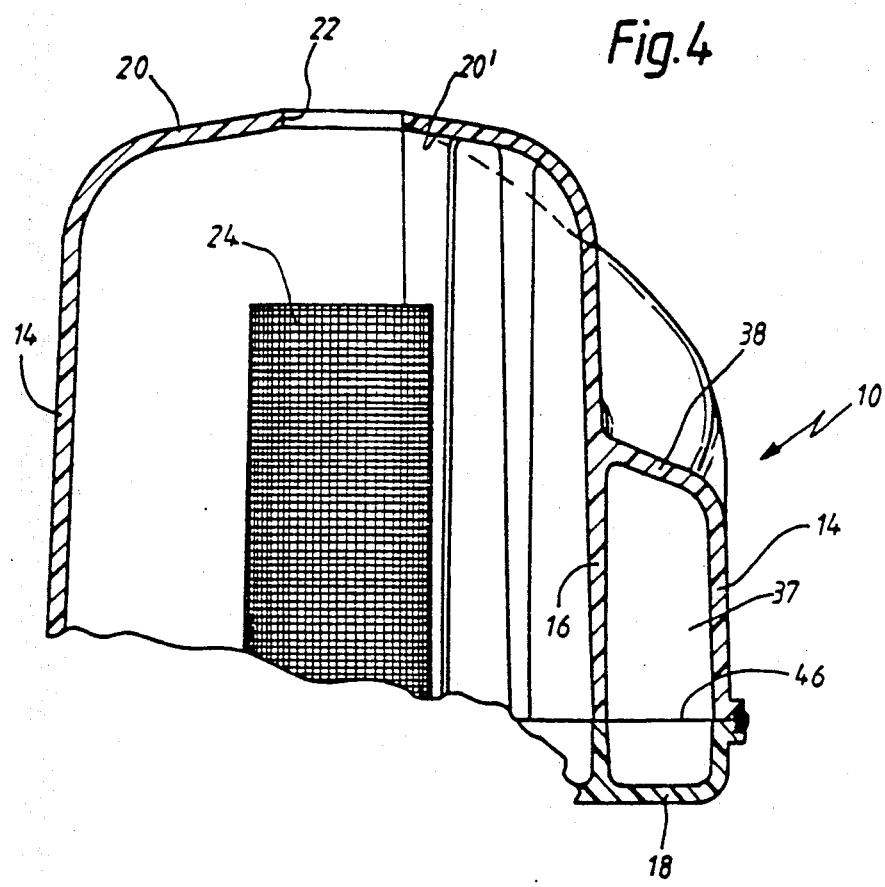

DASHPOT WITH FILTER FOR FUEL TANKS

BACKGROUND AND SUMMARY OF THE INVENTION

The invention relates to a dashpot for fuel tanks of the type having a cover which tapers in the direction of an opening and a jet pump in a base region for the fuel flowing back from a fuel injection installation for an internal combustion engine. A suction filter is disposed in the interior of the dash pot.

A dashpot of this kind is known from DE-PS 2,401,728. In an alternative solution to the pot construction shown, its cover forms a funnel which is explained. The purpose of this funnel is to catch, in the dashpot, fuel sloshing over the latter in the fuel tank and thereby ensure increased introduction of fuel into the pot interior.

For supplying internal combustion engines with fuel, in particular those having fuel injection, it is customary for more fuel to be supplied than is necessary for combustion. During this process, unconsumed fuel is heated, in particular on its way along hot zones, giving rise to gas bubbles in the fuel return line. When this heated fuel flows out of the pump channel of the jet pump opening into the dashpot, the gas bubbles expand and rise upwards. When the dashpot is filled to the maximum, the gas bubbles collect in the annular space, closed towards the top, which is formed by the conical shell surface of the cover tapering into the pot interior and the upper part of the pot wall. The gas bubbles are displaced from the annular space, necessarily moving inwards and obliquely downwards in the dashpot along the conical shell surface of the cover before reaching the opening in the central part of the cover and being able to escape. On their way to the opening in the cover, the gas bubbles at the same time come close to the suction filter, with the result that gas is also drawn off with the fuel to be drawn off.

However, similar conditions are also present if the cover forms a flat lid. In this case, the gas bubbles then rest against the lower surface of the lid and are displaced radially inwards to the opening in the lid, likewise coming close to the suction filter, with the result that in this case too gas is also drawn off together with the fuel.

An object of the invention is to improve the discharge of gas bubbles and to keep gas bubbles away from the suction filter in a dashpot of the above-noted type.

This object is achieved according to the invention by providing a dome shaped cover which is arranged at a spacing above the suction filter.

Because of the dome-like shape of the cover, ascending gas bubbles can collect against the inner surface of the cover far above the suction filter and, during their further upward movement towards the opening of the cover, can move upwards away from the suction filter.

In preferred embodiments the pump channel opens into a guide channel which discharges into the pot interior and is of increasing height in the direction of the inflowing fuel. This arrangement ensures that the fuel flowing into the dashpot and permeated with gas bubbles is prevented over a relatively long section from mixing with fuel already in the pot interior containing the suction filter and that ensures that the fuel loses its gas content during this procedure. During this procedure, the mass of gas bubbles is already able to coalesce at the upper channel wall along the channel region and move upwards along said channel wall. In this arrangement, the height of the guide channel, which increases in the direction of flow of the fuel, causes the gas bubbles to float obliquely upwards, with the result that, when the fuel enters the pot interior, the gas bubbles are already near the highest region of the space and are thus correspondingly distant from the suction filter.

In certain preferred arrangements, it is advantageously provided that the upper channel wall of the guide channel extends in a spiral as far as the pot cover.

In certain preferred embodiments of the invention the upper wall part of the guide channel adjoins the discharge point of the pump channel in the region of the smallest channel height and delimits the discharge point at the top. This arrangement ensures that fuel flowing out of the pump channel of the jet pump cannot become turbulent downstream of the channel exit or cannot become turbulent to such an extent that fuel can thereby foam and result in increased gas bubble formation.

In especially preferred embodiments the pot and channel walls, the cover, part of the pump channel and injection nozzle are formed as an integral molded part, which makes it possible to produce the dashpot from only two individual parts (upper pot part and pot base), which can be produced by the injection method, it being possible to align and shape the injector nozzle and the pump channel of the jet pump in an optimum manner with respect to one another.

Other objects, advantages and novel features of the present invention will become apparent from the following detailed description of the invention when considered in conjunction with the accompanying drawings.

BRIEF DESCRIPTION OF THE DRAWINGS

FIG. 4 is a partial cross-sectional view of the dashpot taken along line IV—IV in FIG. 3.

DETAILED DESCRIPTION OF THE DRAWINGS

Figure 1:
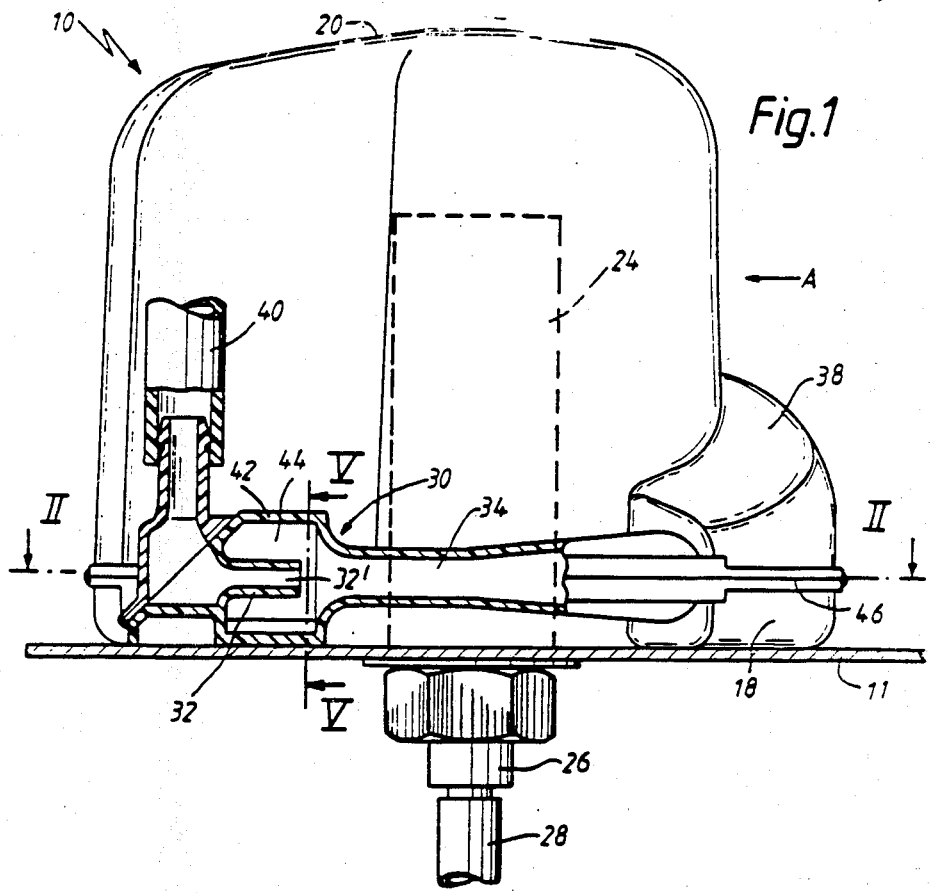
FIG. 1 is a front schematic part-sectional view of a dashpot constructed in accordance with a preferred embodiment of the invention.

In the assembled condition, the dashpot 10 shown is located on the base 11 of a fuel tank of a motor vehicle. It contains an intake chamber 12 from which fuel is continuously withdrawn during the operation of an internal combustion engine of the motor vehicle. The dashpot is delimited by chamber walls 14, 16, a pot base 18 and a dome-shaped cover 20, in the central region of which an opening 22 is provided.

A suction filter 24, which protrudes from below into the intake chamber 12, is located in the center of the pot base 18 and penetrates the base 11 of the fuel tank via connecting nipple 26 to which an intake hose 28 leading to a fuel injection pump is connected. However, it would be also possible, according to other preferred embodiments for such a suction filter, in particular in combination with a pump in the tank, to be passed through the upper, central opening 22 in the cover 20 and for the pot base 18 to be of closed design. In this case, however, it would not be permissible for the opening 22 to be closed by the suction filter.

The intake chamber 12 is kept filled with fuel on a continuous basis. If there is enough fuel in the fuel tank, the intake chamber 12 fills up automatically via its upper opening 22. However, to ensure that the intake chamber 12 always remains sufficiently full, even when the level of fuel in the fuel tank is low, the dashpot is fitted with a jet pump 30 by means of which fuel is continuously withdrawn from the fuel tank in the base region of the latter during the operation of the internal combustion engine and fed to the intake chamber 12. This jet pump 30 is located in the region of the pot base 18 on the outside of the chamber wall 14 merging into the chamber wall 16 and is formed by an injector nozzle 32 and, adjoining the latter, a pump channel 34 which widens approximately in the form of a trumpet in the conveying direction. Said pump channel extends along the periphery of an outer peripheral part of the chamber wall 16, which, in plan view, is arc-shaped, ends at 36 and, together with the chamber wall 14, which is concentric to it, delimits the intake chamber 12.

Figure 2:
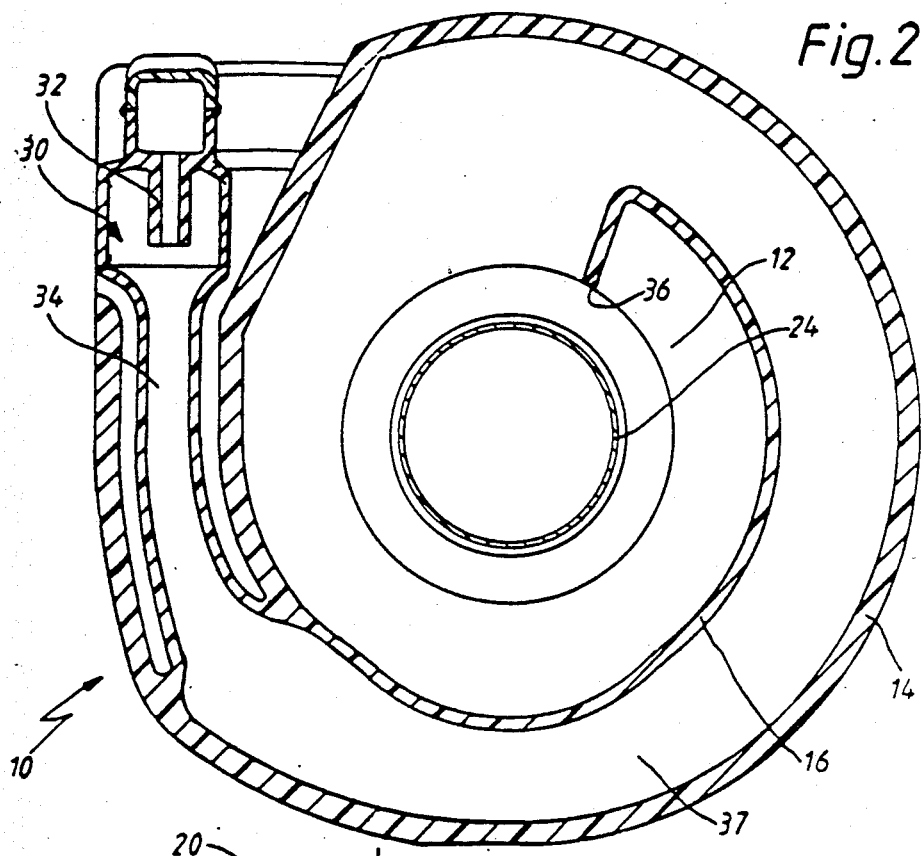
FIG. 2 is a sectional view of the dashpot taken along Section line II—II of FIG. 1.
Figure 3:
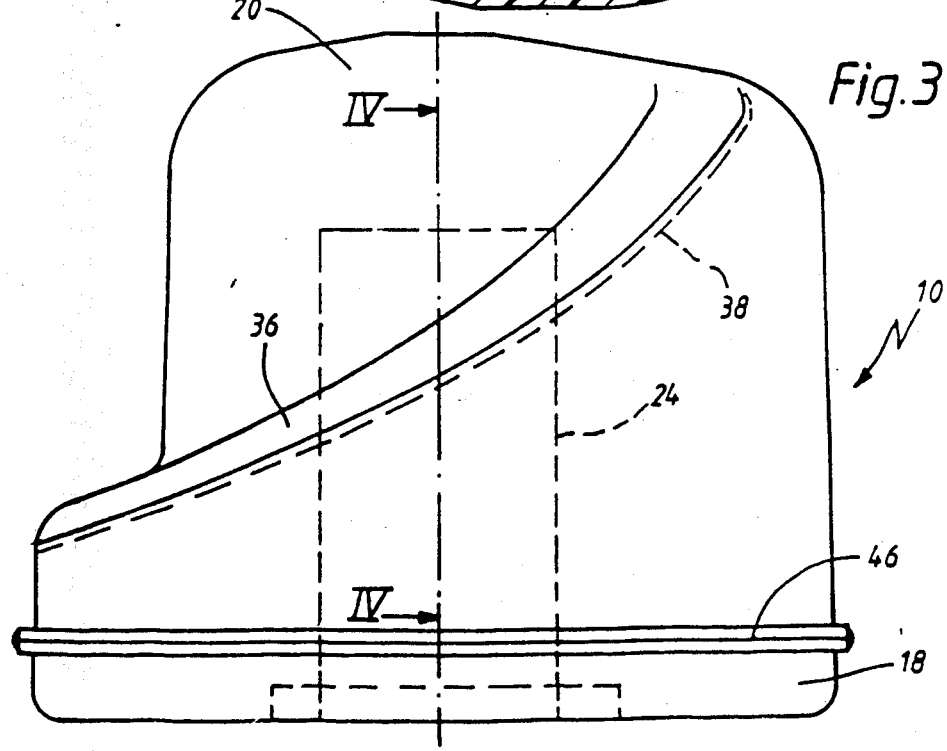
FIG. 3 is a side view of the dashpot as seen in the direction of arrow A in FIG. 1.

As FIG. 2 shows, the pump channel 34 opens into an arc-shaped guide channel 37 which is delimited by the two chamber walls 14, 16, the pot base 18 and an upper channel wall 38 and, having followed a course of about 180°, opens into the intake chamber 12. In the direction of the inflowing fuel, this guide channel 37 is of increasing height, its upper channel wall 38 rising in the form of a spiral by reason of the arc-shaped course of the channel.

The jet pump 30 is operated by means of fuel which is not required for operating the internal combustion engine.

This excess fuel is fed to the injector nozzle 32 via a fuel return line 40 which preferably passes through the upper wall of the fuel tank, the stream of fuel exiting from the nozzle and directed into the rear end of the pump channel 34 generating a partial vacuum in the vicinity of the injector nozzle 32 arranged on the outside of the dashpot 10, and entraining fuel which is present in the fuel tank into the pump channel 34 and feeding it to the intake chamber 12.

Figure 5:
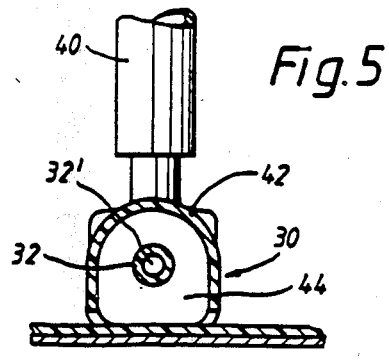
FIG. 5 is a partial sectional view taken along line V—V in FIG. 1.

As can be seen from FIGS. 1 and 5, the injector nozzle 32 is overlapped by a shield 42 which extends away from the inlet of the pump channel 34, is closed at the rear end and is preferably arranged concentric to the injector nozzle 32 (FIG. 5). To the side of the injector nozzle 32, it extends as far as a plane lying below the nozzle orifice 32'. The fuel flowing out of the injector nozzle 32 draws fuel out of the fuel tank into the pump channel 34, with the result that a sufficient volume of fuel is available for intake even when the quantity of fuel remaining in the fuel tank is only small.

At the same time, the shield 42 ensures that the injector nozzle 32 is located within a space 44 which is only accessible from below, thus avoiding sloshing during the operation of the jet pump 30 even when the fuel level is extremely low, said sloshing reducing the efficiency of the pump. In this arrangement, it is also possible for the design to be such that the jet pump 30 draws in fuel exclusively at the underside of the base of the dashpot.

The heated fuel emerging from the injector nozzle 32 contains gas bubbles which, after leaving the injector nozzle 32, expand and rise upwards in the fuel. When the dashpot is full, these float upwards within the guide channel 37, along the upper channel wall 38 of the dashpot, until finally, in the region of the exit of the guide channel 37, they arrive in the intake chamber 12 at a point relatively far above the suction filter 24 and, because of their directed movement within the guide channel 37, radially outside the suction filter 24 at the inner surface 20' of the cover 30 and then, by reason of their tendency to rise, make for the highest point of the dome-like cover 20, where they can leave the intake chamber 12 via the opening 22.

The design described makes it possible to produce the dashpot 10 in an advantageous manner since the latter can be manufactured from just two parts which can be produced separately. In this arrangement, one part forms the pot base 18 with one half of components 32, 34 of the jet pump 30, while the remaining part of the dashpot 10 forms the other part. The parting line between the two parts, which are preferably composed of plastic and welded together, is designated by 46.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Dashpot for fuel tanks, which has a generally dome-shaped cover means, a guide channel means which tapers upwardly toward an opening in the dome-shaped cover means, said guide channel means having a jet pump in a base region receiving fuel flowing back from a fuel injection installation of an internal combustion engine, the jet pump being arranged at a periphery of the dashpot and having a pump channel means which opens approximately tangentially into the dashpot interior, a suction filter located in the dashpot interior and connected to a fuel output, filter being arranged spaced from and below the cover, and wherein the pump channel means directs any bubbles in the fuel from the jet pump into the dashpot interior where the bubbles will rise upwardly from the side channel toward the dome-shaped cover means and out the opening instead of through the suction filter.

2. Dashpot according to claim 1, wherein the pump channel means opens into said guide channel means which discharges into the pot interior and is of increasing height in the direction of the inflowing fuel so as to direct bubbles in the fuel against the dome-shaped cover means.

3. Dashpot according to claim 2, wherein an upper wall part of the guide channel extends in a spiral as far as the pot cover.

4. Dashpot according to claim 3, wherein an upper wall part of the guide channel adjoins the discharge point of the pump channel in the region of the smallest channel height and delimits said discharge point at the top.

5. Dashpot according to claim 2, wherein the dome-shaped cover means and part of the pump channel and injector nozzle of the jet pump are formed as an integral molded part.

6. Dashpot according to claim 5, wherein said integral moulded part is formed of plastic.

* * * * *